(12) United States Patent
Okumura

(10) Patent No.: US 9,013,657 B2
(45) Date of Patent: Apr. 21, 2015

(54) LIQUID CRYSTAL DEVICE, ELECTRONIC DEVICE AND PROJECTOR WITH MAXIMUM-LIGHT-INTENSITY DIRECTION INCLINED FROM THE DIRECTION NORMAL TO THE SUBSTRATES

(71) Applicant: Seiko Epson Corporation, Tokyo (JP)

(72) Inventor: Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/285,643

(22) Filed: May 23, 2014

(65) Prior Publication Data

US 2014/0253820 A1 Sep. 11, 2014

Related U.S. Application Data

(62) Division of application No. 12/370,743, filed on Feb. 13, 2009, now Pat. No. 8,773,621.

(30) Foreign Application Priority Data

Mar. 3, 2008 (JP) ................................. 2008-051699

(51) Int. Cl.
*G02F 1/1333* (2006.01)
*G02F 1/1335* (2006.01)
*G02F 1/1337* (2006.01)
*G03B 21/14* (2006.01)
*H04N 9/31* (2006.01)
*G03B 21/00* (2006.01)

(52) U.S. Cl.
CPC ........ *G02F 1/133528* (2013.01); *G02F 1/1337* (2013.01); *G03B 21/14* (2013.01); *H04N 9/3114* (2013.01); *G03B 21/006* (2013.01)

(58) Field of Classification Search
USPC ....................................... 349/96, 99, 102, 103
See application file for complete search history.

(56) References Cited

U.S. PATENT DOCUMENTS

| 5,473,339 | A | 12/1995 | Kanatani et al. |
| 6,842,207 | B2 | 1/2005 | Nishida et al. |
| 7,659,946 | B2 | 2/2010 | Shirasaka et al. |
| 2006/0274249 | A1 | 12/2006 | Nishida et al. |

FOREIGN PATENT DOCUMENTS

| CN | 1438528 | A | 8/2003 |
| CN | 1977213 | A | 6/2007 |
| JP | 62197130 | U | 12/1987 |
| JP | 371110 | A | 3/1991 |
| JP | 553090 | A | 3/1993 |
| JP | 7234401 | A | 9/1995 |
| JP | 980436 | A | 3/1997 |
| JP | 200056254 | A | 2/2000 |
| JP | 200056302 | A | 2/2000 |
| JP | 200531367 | A | 2/2005 |

OTHER PUBLICATIONS

Office Action mailed Jan. 12, 2012, corresponding to Chinese patent application No. 200910008368.1.

*Primary Examiner* — Lauren Nguyen
(74) *Attorney, Agent, or Firm* — Lowe Hauptman & Ham, LLP

(57) ABSTRACT

A liquid crystal device includes a liquid crystal panel including a pair of substrates that sandwiches a liquid crystal layer containing liquid crystal molecules exhibiting a parallel alignment in an initial alignment state, and a polarizing plate disposed on either side of the liquid crystal panel. The liquid crystal molecules are inclined at a pretilt angle and aligned in a predetermined direction in planes of the substrates. The liquid crystal panel emits light entering through one of the polarizing plates toward the other. The liquid crystal panel emits light having the maximum intensity in a direction different from a direction normal to the substrates. The azimuth of the maximum-light-intensity direction projected onto the planes of the substrates is substantially parallel to the predetermined direction. The maximum-light-intensity direction is a direction inclined from the direction normal to the substrates toward a direction in which the maximum-light-intensity direction form a right angle with a longitudinal direction of the liquid crystal molecules inclined at the pretilt angle.

6 Claims, 17 Drawing Sheets

LIQUID CRYSTAL DEVICE, ELECTRONIC DEVICE AND PROJECTOR WITH MAXIMUM-LIGHT-INTENSITY DIRECTION INCLINED FROM THE DIRECTION NORMAL TO THE SUBSTRATES

RELATED APPLICATIONS

The present application is a divisional of application Ser. No. 12/370,743, filed Feb. 13, 2009, which claims priority from, Japanese Application No. 2008-051699, filed Mar. 3, 2008. The disclosure of application Ser. No. 12/370,743 and Japanese Application No. 2008-051699 are hereby incorporated by reference herein in their entirety.

BACKGROUND

1. Technical Field

The present invention relates to a liquid crystal device, an electronic device and a projector.

2. Related Art

The contrast of liquid crystal devices employing a liquid crystal driving method such as a known twisted nematic (TN) mode greatly depends on the viewing angle. In such liquid crystal devices, the contrast of an image viewed straight on is different from that viewed at an angle, and it is impossible to view a good image from an oblique angle. However, such a situation was greatly improved by the development of a lateral-electric-field operation type driving mode called an in-plane switching (IPS) mode or a fringe-field switching (FFS) mode, and a vertical alignment driving mode called a vertical alignment (VA) mode (for example, refer to JP-A-9-80436).

However, even in such liquid crystal devices employing the above-mentioned driving modes to improve the viewing-angle dependent properties, the contrast ratio often drops from 1000:1 or higher when viewed normal to the front display surface to several tens:1 when viewed from an oblique angle. FIG. 19 is a contrast curve showing the viewing-angle characteristics of an IPS mode liquid crystal device. As shown in FIG. 19, a displayed image at a position AR1 near the center of FIG. 19, which corresponds to a displayed image viewed in the normal direction, has high contrast in substantially the entire area thereof. However, a displayed image at a position of AR2 shifted from the center of FIG. 19, which corresponds to a displayed image viewed at an angle of 15 degrees, for example, has low contrast at the corners of the image. Liquid crystal devices employing the FFS mode or VA mode have the same tendency.

Such a decrease in contrast occurring in an image viewed at an angle is disadvantageous in some fields of application, more specifically, in display devices that allows an observer to observe an image from a certain angle off normal to the display surface or that projects an image in a certain direction. Examples of such display devices include, for example, head-up displays (HUDs), head-mounted displays (HMDs), electronic viewfinders (EVFs), and projectors.

An example is shown below. FIG. 20 is a schematic view of a passenger car equipped with an HUD. A head-up display 900 stored in a dashboard 95 of a passenger car includes a liquid crystal device 91 for modulating light emitted from a backlight 92, and a concave mirror 93 for projecting light L (image light) emitted through the liquid crystal device 91 onto a front window 94 to enlarge a displayed image. A front window shield 96 that reflects the projected light L toward an occupant M is disposed on the front window 94. The occupant M observes a virtual image I formed by the light L reflected by the front window shield 96.

At this time, outside light SL, such as sunlight, entering the liquid crystal device 91 through the front window 94 is specularly reflected (mirror-reflected) by the liquid crystal device 91 at the surface adjacent to the concave mirror 93 toward the occupant M along the same optical path as the light L emitted from the backlight 92, and makes it difficult to view an image on the HUD.

To counter this situation, a structure is proposed in which the liquid crystal device 91 is disposed obliquely to allow the outside light SL reflected by the liquid crystal device 91 at the surface adjacent to the concave mirror 93 to be guided in the direction which the occupant M cannot see. However, in such a structure, the contrast of the displayed image decreases greatly because of the viewing-angle dependent properties, and it is impossible to display images properly.

Although a proposal for improving reflection of the outgoing light in the device using the structure of the liquid crystal device has been made by, for example, JP-A-5-53090, a proposal for correcting the problem in the relationship between the outside light and the displayed image using the structure of the device has not been made. Therefore, there are demands for liquid crystal devices having good display characteristics when viewed from a certain viewing-angle, not in a direction normal to the liquid crystal device, developed on the basis of a design concept that is different from that of a known liquid crystal device.

SUMMARY

An advantage of some aspects of the invention is that it provides an improved liquid crystal device having increased contrast of a displayed image when viewed from a certain viewing-angle, and provides an electronic device and a projector each having the liquid crystal device of the invention.

According to a first aspect of the invention, a liquid crystal device includes a liquid crystal panel including a pair of substrates that sandwiches a liquid crystal layer containing liquid crystal molecules exhibiting a parallel alignment in an initial alignment state, and a polarizing plate disposed on either side of the liquid crystal panel. The liquid crystal molecules are inclined at a pretilt angle and aligned in a predetermined direction in planes of the substrates. The liquid crystal panel emits light entering through one of the polarizing plates toward the other. The liquid crystal panel emits light having the maximum intensity in a direction different from a direction normal to the substrates. The azimuth of the maximum-light-intensity direction projected onto the planes of the substrates is substantially parallel to the predetermined direction. The maximum-light-intensity direction is a direction inclined from the direction normal to the substrates toward a direction in which the maximum-light-intensity direction form a right angle with a longitudinal direction of the liquid crystal molecules inclined at the pretilt angle.

In this configuration, the light transmitted through the liquid crystal layer in the specific direction forms nearly a right angle with the longitudinal direction of the liquid crystal molecules. Therefore, a change in viewing angle is less likely to vary the angle between the liquid crystal director and the polarization direction of the transmitted light, whereby the light passes in an ideal phase. Accordingly, the light transmitted in the specific direction or the viewing-angle directions adjacent thereto is less likely to cause contrast degradation due to the phase difference, whereby the liquid crystal device can display a high-quality image in the specific direction.

According to a second aspect of the invention, a liquid crystal device includes a liquid crystal panel operating in a vertical alignment mode and including a pair of substrates that sandwiches a liquid crystal layer containing liquid crystal molecules having a negative anisotropy of dielectric constant, and a polarizing plate disposed on either side of the liquid crystal panel. The liquid crystal molecules are inclined at a pretilt angle and aligned in a predetermined direction in planes of the substrates. The liquid crystal panel emits light entering through one of the polarizing plates toward the other. The liquid crystal panel emits light having the maximum intensity in a direction different from a direction normal to the substrates. The azimuth of the maximum-light-intensity direction projected onto the planes of the substrates is substantially parallel to the predetermined direction. The maximum-light-intensity direction is a direction inclined from the direction normal to the substrates toward a direction in which the maximum-light-intensity direction and a longitudinal direction of the liquid crystal molecules inclined at the pretilt angle are parallel to each other.

In this configuration, because the light transmitted through the liquid crystal layer in the specific direction propagates substantially parallel to the liquid crystal molecules, the light is less likely to be affected by the birefringence of the liquid crystal molecules and passes in an ideal phase, even if the viewing angle is changed. Accordingly, the light transmitted in the viewing-angle directions around the specific direction is less likely to cause contrast degradation due to the phase difference, whereby the liquid crystal device can display a high-quality image in the specific direction.

In the invention, it is preferable that an absorption axis direction of one of the polarizing plates be substantially parallel to the predetermined direction, and the polarizing plate be inclined from the substrates of the liquid crystal panel toward a direction in which a direction normal to the polarizing plate and the maximum-light-intensity direction are parallel to each other.

In this configuration, a combination of the inclined polarizing plate and the other polarizing plate provides high light-shielding performance in the viewing-angle directions around the specific direction. Accordingly, the liquid crystal device can display a high-quality image in the specific direction.

According to a third aspect of the invention, a liquid crystal device includes a liquid crystal panel including a pair of substrates that sandwiches a liquid crystal layer containing liquid crystal molecules exhibiting a parallel alignment in an initial alignment state, and a polarizing plate disposed on either side of the liquid crystal panel. The liquid crystal molecules are aligned in a predetermined direction in planes of the substrates. The liquid crystal panel emits light entering through one of the polarizing plates to the other one of the polarizing plates. The liquid crystal panel emits light having the maximum intensity in a direction different from a direction normal to the substrates. An absorption axis direction of one of the polarizing plates is substantially perpendicular to the predetermined direction. The polarizing plate with the absorption axis direction substantially perpendicular to the predetermined direction is inclined from the substrates of the liquid crystal panel toward a direction in which a direction normal to the polarizing plate and the maximum-light-intensity direction are parallel to each other.

In this configuration, a change in viewing angle within the viewing-angle directions around the specific direction is less likely to vary the angle between the liquid crystal director and the polarization direction of the light transmitted through the polarizing plate. Accordingly, the liquid crystal device can display a high-quality image in the specific direction.

In the invention, it is preferable that a light source be disposed adjacent to one of the polarizing plates on the side opposite the liquid crystal panel, and a direction in which the light source emits light be aligned with the direction in which the light emitted from the liquid crystal panel has the maximum intensity.

In this configuration, the direction in which the light source emits light is a desired maximum-light-intensity direction. Accordingly, the liquid crystal device can emit light from the light source in the maximum-intensity direction effectively and display a high-quality image in the specific direction.

In the invention, it is preferable that the liquid crystal device further include a viewing-angle compensation retardation film, and the retardation film be inclined from the substrates of the liquid crystal panel toward a direction in which a direction normal to the retardation film and the maximum-light-intensity direction are parallel to each other.

In this configuration, the light transmitted through the retardation film is less likely to be affected by the viewing-angle dependent properties of the retardation film and is less likely to cause contrast degradation due to the phase difference. Thus, the liquid crystal device can display a high-quality image in the specific direction.

An electronic device of the invention includes the above-described liquid crystal device which displays an image in the direction in which the light emitted from the liquid crystal device has the maximum intensity.

In this configuration, the electronic device can display a high-contrast, high-quality image in a direction different from the direction normal to the liquid crystal device.

A projector of the invention includes the above-described liquid crystal device which projects an image in the direction in which the light emitted from the liquid crystal device has the maximum intensity.

In this configuration, the projector can display a high-contrast, high-quality image in a direction different from the direction normal to the liquid crystal device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
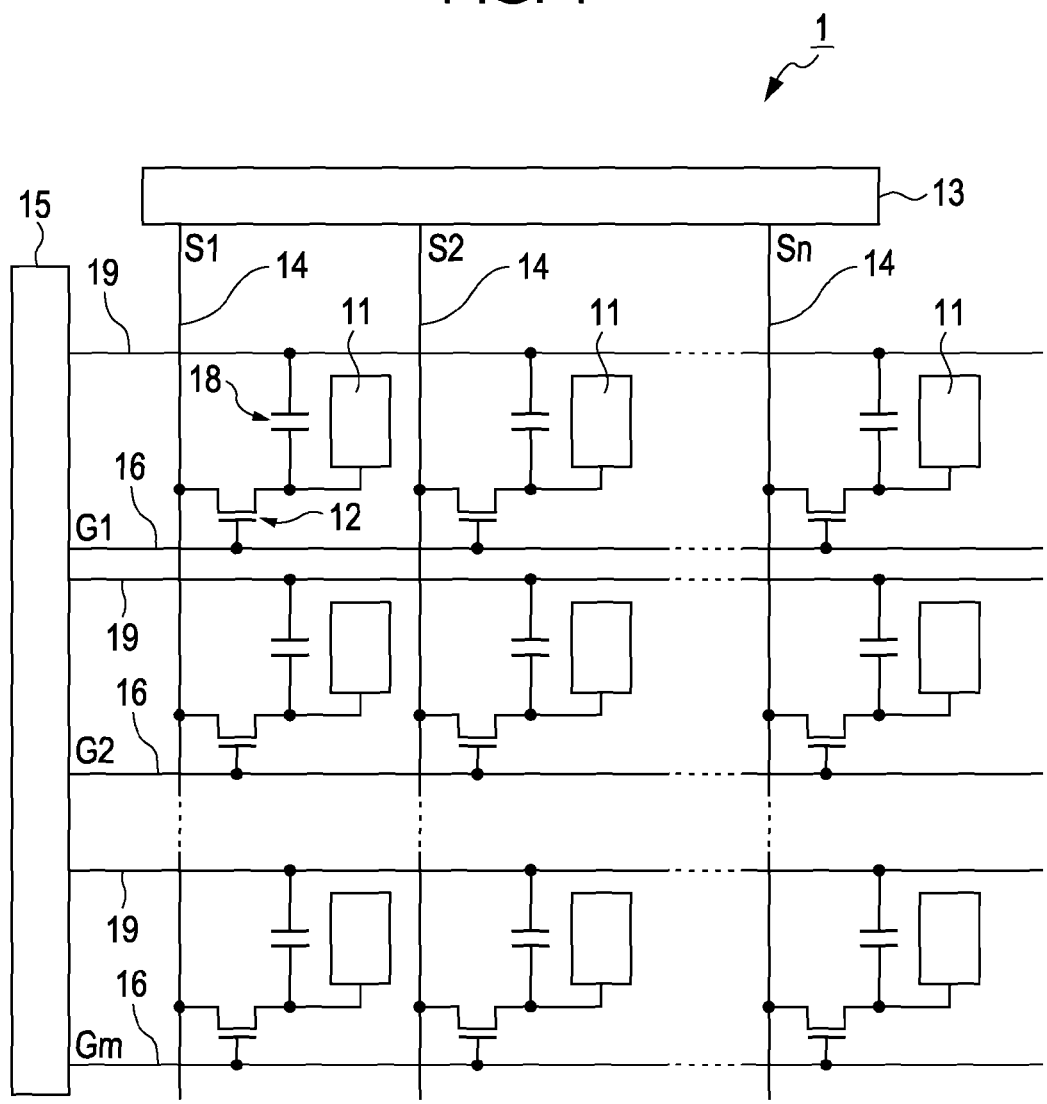
FIG. 1 is a circuit diagram of a liquid crystal device according to a first embodiment of the invention.

A liquid crystal device according to a first embodiment of the invention will now be described with reference to FIGS. 1 to 7. In the drawings, the film thickness and dimensional ratio of the components are not to scale for clarity's sake.

First, a schematic structure of a liquid crystal device is described. As shown in FIG. 1, the liquid crystal device 1 includes a plurality of sub-pixel areas arranged in a matrix, which constitute a pixel display area. The plurality of sub-pixel areas of the liquid crystal device 1 each includes a pixel electrode (first electrode) 11 and a thin-film transistor (TFT) element (driving element) 12 for performing switching-control of the pixel electrode 11. The source of each TFT element 12 is connected to one of data lines 14 extending from a data-line driving circuit 13 provided on the liquid crystal device 1, the gate of the TFT element 12 is connected to one of scanning lines 16 extending from a scanning-line driving circuit 15 provided on the liquid crystal device 1, and the drain of the TFT element 12 is connected to the pixel electrode 11.

The data-line driving circuit 13 outputs image signals S1, S2 to Sn to the sub-pixel areas through the data lines 14. The scanning-line driving circuit 15 outputs scanning signals G1, G2 to Gm to the sub-pixel areas through the scanning lines 16. The data-line driving circuit 13 may output the image signals S1 to Sn in sequence in a line-sequential manner or it may output the image signals S1 to Sn to groups of adjacent data lines 14. The scanning-line driving circuit 15 outputs the scanning signals G1 to Gm pulsed at a predetermined timing, in a line-sequential manner.

In the liquid crystal device 1, when the TFT elements 12, serving as switching elements, are turned on for a certain period of time upon input of the scanning signals G1 to Gm, the image signals S1 to Sn output from the data lines 14 are written to the pixel electrodes 11 at a predetermined timing. The image signals S1 to Sn at a predetermined level, written to a liquid crystal layer through the pixel electrodes 11, are held between the pixel electrodes 11 and a common electrode 41, which is described below, for a certain period of time. The liquid crystal layer is disposed between the pixel electrodes 11 and the common electrode 41. To prevent the image signals S1 to Sn held between the pixel electrodes 11 and the common electrode 41 from leaking, storage capacitors 18 are connected in parallel with a liquid crystal capacitor formed between the pixel electrodes 11 and the common electrode 41. The storage capacitors 18 are provided between the drains of the TFT elements 12 and capacitor lines 19.

Figure 2:
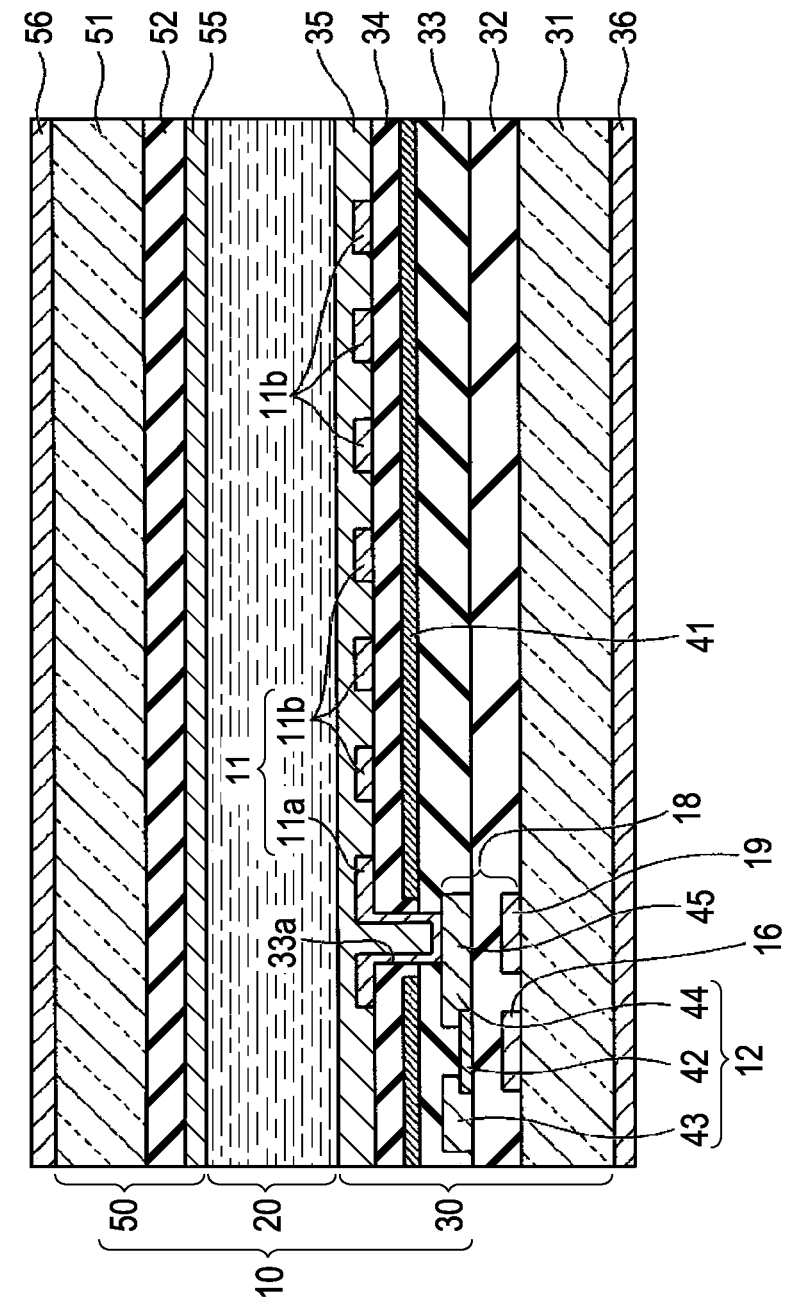
FIG. 2 is a partial sectional view of the liquid crystal device according to the first embodiment.
Figure 3:
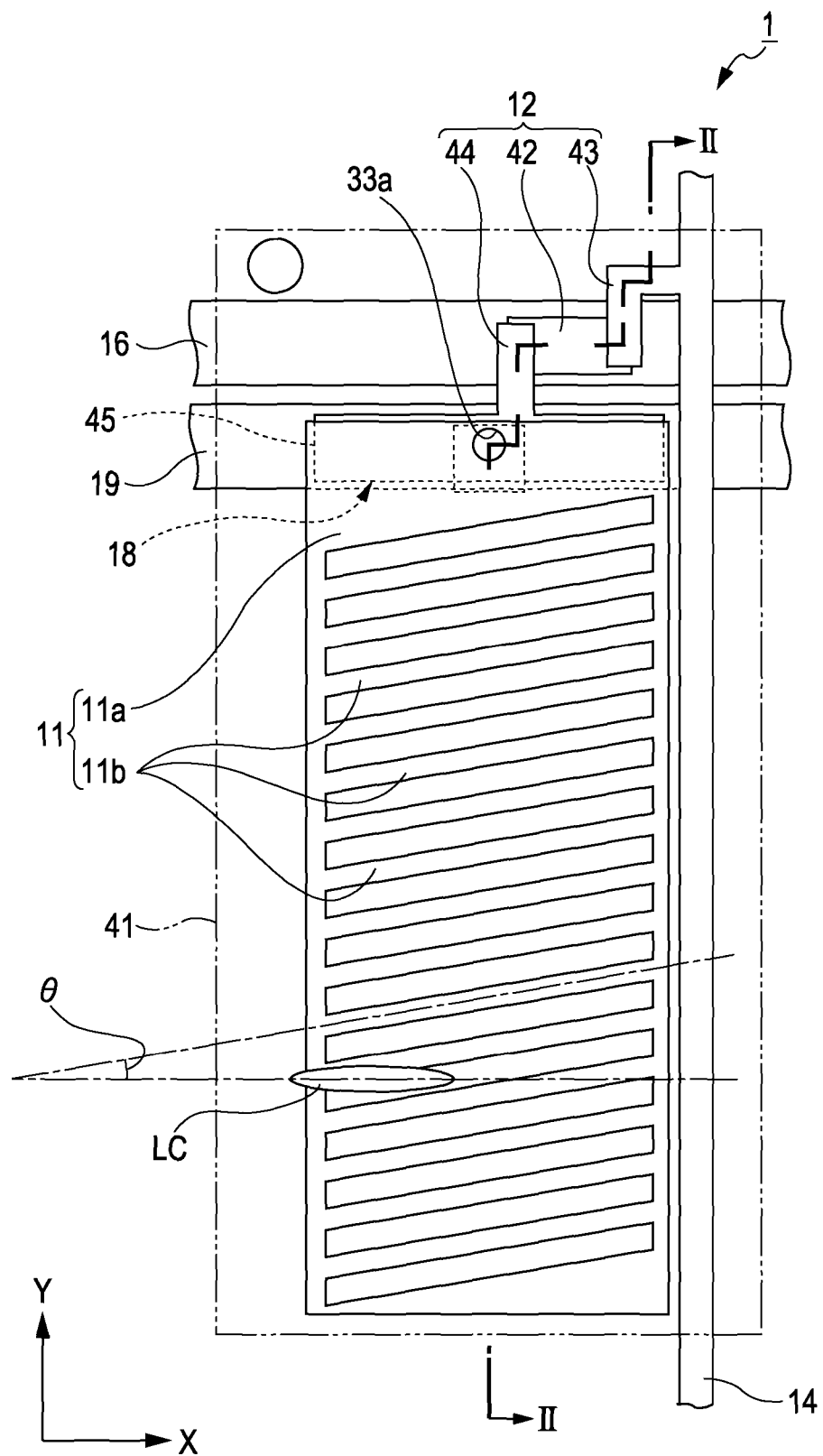
FIG. 3 is a partial plan view of a sub-pixel area of the liquid crystal device according to the first embodiment.

Referring to FIGS. 2 and 3, the structure of the liquid crystal device 1 will be described in detail. FIG. 2 is a partial sectional view of the liquid crystal device, and FIG. 3 is a partial plan view of a sub-pixel area of the liquid crystal device. FIG. 2 is the sectional view taken along line II-II in FIG. 3. The following description will be given on the assumption that the liquid crystal device 1 of this embodiment employs an FFS mode, a driving mode of a lateral-electric-field operation type. However, even if the liquid crystal device 1 employs an IPS mode, which is also a driving mode of a lateral-electric-field operation type, the same advantages can be obtained.

As shown in FIG. 2, the liquid crystal device 1 includes a liquid crystal panel 10 formed of an element substrate (substrate) 30, a counter substrate (substrate) 50 facing the element substrate 30, and a liquid crystal layer 20 disposed between the element substrate 30 and the counter substrate 50; a polarizing plate 36 provided on the outer surface side (opposite side of the liquid crystal layer 20) of the element substrate 30; and a polarizing plate 56 provided on the outer surface side of the counter substrate 50. The liquid crystal device 1 further includes a sealing material (not shown) provided along the periphery of the area in which the element substrate 30 and the counter substrate 50 face each other so as to seal the liquid crystal layer 20. In the liquid crystal device 1, illuminating light enters through the element substrate 30 and the counter substrate 50 is the display side.

The element substrate 30 has a transparent substrate body 31. Examples of the material of the substrate body 31 include inorganic materials such as glass, silica glass, and silicon nitride, and organic polymers (resins) such as acrylic resin and polycarbonate resin. A composite material formed by laminating or mixing the aforementioned materials may be used as long as transparency is ensured.

The scanning lines 16 and the capacitor lines 19, formed of a conductive material such as aluminum or copper, are formed parallel to one another on the surface of the substrate body 31 adjacent to the liquid crystal layer 20. The scanning lines 16 and the capacitor lines 19 may be made of either the same material or different materials. The scanning lines 16 and the capacitor lines 19 are made by patterning an aluminum conductive film, for example.

A gate insulating film 32 covering the scanning lines and the capacitor lines 19 is formed on the substrate body 31. The gate insulating film 32 is made of a light-transmissive material having insulating properties, such as silicon nitride or oxide silicon.

Semiconductor layers 42, source electrodes 43, and drain electrodes 44 are formed on the gate insulating film 32. The semiconductor layers 42, the source electrodes 43, the drain electrodes 44, and the scanning lines 16 formed on the substrate body 31 constitute the driving TFTs 12. The drain electrodes 44 are connected in a conductive manner to capacitor electrodes 45, which, together with the capacitor lines 19, constitute the storage capacitors 18.

The semiconductor layers 42 are formed of a semiconductor such as amorphous silicon. The source electrodes 43 branch off the data lines 14 (not shown) formed on the same gate insulating film 32 and are each connected to an end of the corresponding semiconductor layer 42. The drain electrodes 44 are connected in a conductive manner to the capacitor electrodes 45, and each connected to the other end of the semiconductor layer 42.

An interlayer insulating film 33 covering the driving TFTs 12, the capacitor electrodes 45, and the data lines 14 (not shown) is formed on the gate insulating film 32. The interlayer insulating film 33 is formed of a light-transmissive material having insulating properties, such as silicon nitride or oxide silicon gate, similarly to the gate insulating film 32. Contact holes 33a, which are through-holes for connecting the pixel electrodes 11 and the driving TFTs 12 in a conductive manner, are provided in the interlayer insulating film 33 at positions where the interlayer insulating film 33 overlies the capacitor electrodes 45.

The common electrode 41 is formed on the interlayer insulating film 33. The common electrode 41 is strip-shaped, and is formed of a light-transmissive conductive material such as indium tin oxide (ITO), similarly to the pixel electrodes 11. The common electrode 41 is more distant from the liquid crystal layer 20 than the pixel electrodes 11, that is, closer to the substrate body 31 than the pixel electrodes 11 (i.e., the common electrode 41 is provided between the substrate body 31 and the pixel electrodes 11). A predetermined constant potential for driving the liquid crystal layer 20 or 0V, or a signal whose potential is periodically (on a frame-period or field-period basis) switched between two predetermined constant potentials is applied to the common electrode 41.

An interelectrode insulating film 34 that has the contact holes 33a and is formed of a light-transmissive material having insulating properties, such as silicon nitride or oxide silicon, is formed on the common electrode 41. The pixel electrodes 11 having the shape corresponding to the shape of sub-pixels P are formed on the interelectrode insulating film 34 and are electrically connected to the drain electrodes 44 of the driving TFTs 12 through the contact holes 33a. The pixel electrodes 11 are made of a transparent conductive material such as ITO. In this embodiment, the pixel electrodes 11 are made of ITO.

An alignment film 35 covering the pixel electrodes 11 is formed on the interelectrode insulating film 34. The alignment film 35 is made of an organic material such as polyimide or an inorganic material such as silicon oxide, and serves to align the liquid crystal molecules in the liquid crystal layer 20 in a certain direction when no voltage is applied. In this embodiment, the alignment film is formed by rubbing the upper surface of a polyimide film formed by depositing, drying and curing polyimide.

The counter substrate 50 has a transparent substrate body 51. The substrate body 51 may be made of, similarly to the substrate body 31, an inorganic material such as glass, silica glass, or silicon nitride, or an organic polymer (resin) such as acrylic resin or polycarbonate resin. As long as it is transparent, a composite material formed by laminating or mixing these materials may be used.

A color filter layer 52 is formed on the surface of the substrate body 51 adjacent to the liquid crystal layer 20. The color filter layer 52 is disposed so as to correspond to the shape of the sub-pixels and contains color materials corresponding to the display colors of the sub-pixels.

An alignment film 55 is provided on the color filter layer 52. The alignment film 55 is made of an organic material such as polyimide or an inorganic material such as silicon oxide, and serves to align the liquid crystal molecules in the liquid crystal layer 20 in a certain direction when no voltage is applied. In this embodiment, the alignment film 55 is formed by rubbing the upper surface of a polyimide film formed by depositing, drying and curing polyimide. The alignment direction of the alignment film 55, defined by the rubbing, is antiparallel to that of the alignment film 35.

The liquid crystal molecules in the liquid crystal layer 20 disposed between the element substrate 30 and the counter substrate 50 have positive anisotropy of dielectric constant and are aligned in the rubbing directions of the alignment films 35 and 55. In the liquid crystal layer 20, the liquid crystal molecules are in a homogeneous alignment.

The polarizing plate 36 is disposed on the substrate body 31 on the surface opposite to the surface in contact with the liquid crystal layer 20, and the polarizing plate 56 is disposed on the substrate body 51 on the surface opposite to the surface in contact with the liquid crystal layer 20. These polarizing plates 36 and 56 are arranged in a cross-Nicol state, in which their polarizing axes (absorption axes) are perpendicular to each other, and one of their absorption axes is parallel to the alignment directions of the alignment films 35 and 55.

Referring to a plan view of FIG. 3, a planar wiring structure in the vicinity of one of the sub-pixels P in the liquid crystal device 1 of this embodiment will be described. In FIG. 3, only the wires and semiconductor layer on the element substrate 30 are illustrated, and the insulating films are not illustrated. The width and size of the wires are not to scale for clarity's sake.

As shown in FIG. 3, the scanning lines 16 and the capacitor lines 19 are arranged substantially parallel to each other. In FIG. 3, these lines extend in the horizontal direction. The data lines 14 are arranged perpendicular to these scanning lines 16 and capacitor lines 19. Accordingly, the scanning lines 16, the data lines 14, and the capacitor lines 19 are arranged substantially in a grid pattern in the plan view.

The source electrodes 43, which are inverted L-shaped in the plan view, branch off the data lines 14 and are each connected to an end of the corresponding semiconductor layer 42 laid above the scanning line 16. The drain electrodes 44 are each connected to the other end of the corresponding semiconductor layer 42. The semiconductor layer 42, the source electrode 43, and the drain electrode 44 form the driving TFT 12. The drain electrodes 44 are connected to the capacitor electrodes 45 laid above the capacitor lines 19, and thus form the storage capacitors 18.

The pixel electrodes 11 are substantially ladder-shaped in the plan view and laid above the common electrode 41. Each pixel electrode 11 has, in the plan view of FIG. 3, a rectangular frame portion 11a and a plurality (15) of strip-shaped electrodes (strip-shaped portions) 11b that extend substantially in the horizontal direction and are spaced apart and parallel to one another in the vertical direction. In FIG. 3, both ends of each strip-shaped electrode 11b are connected to the vertical portions of the frame portion 11a.

The alignment direction of the alignment films (not shown) agrees with the horizontal direction in FIG. 3. The strip-shaped electrodes 11b are inclined at about 20 degrees to the horizontal direction in FIG. 3. Therefore, in the initial state where no voltage is applied, the angle, θ, formed between liquid crystal molecules LC and the strip-shaped electrodes 11b is about 20 degrees. Thus, the pixel electrodes 11 and the common electrode 41 are disposed with the interelectrode insulating film 34 therebetween and form an FFS mode electrode structure.

Referring to FIGS. 4 to 7, features and functions of the liquid crystal device 1 according to this embodiment will be described.

Figure 4:
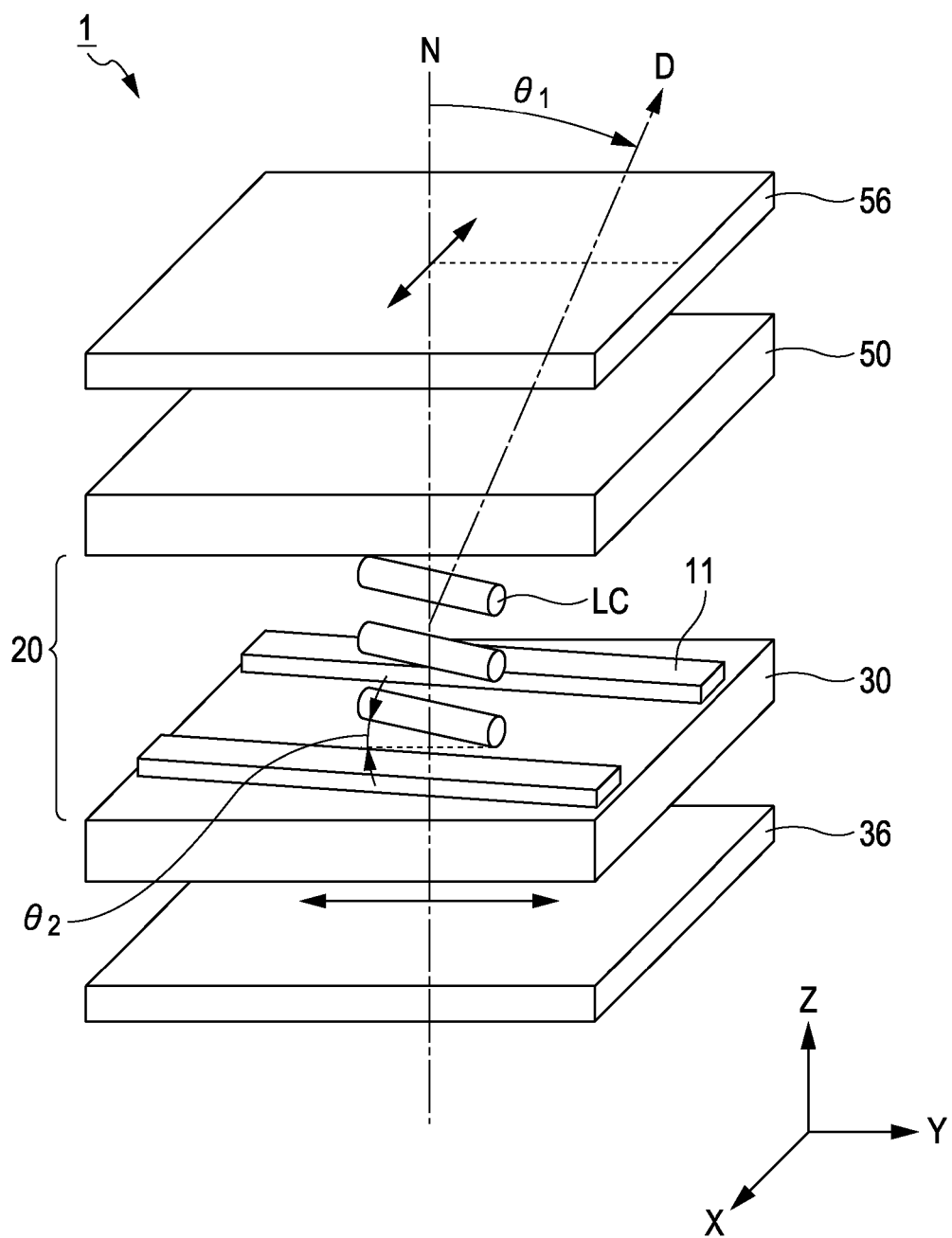
FIG. 4 is an exploded perspective view of the liquid crystal device according to the first embodiment.

FIG. 4 is an exploded perspective view of the liquid crystal device 1. For explanation's sake, the liquid crystal molecules LC in the liquid crystal layer 20 are illustrated as cylindrical objects whose longitudinal direction is the director direction. In the following description, the relationship between light transmitted through the liquid crystal device 1 and a priority viewing-angle direction, which is the maximum-intensity direction of the transmitted light, will be described by setting and referring to an XYZ orthogonal coordinate system. A predetermined direction in a horizontal plane is defined as an X-axis direction, the direction orthogonal to the X-axis direction in the horizontal plane is defined as a Y-axis direction, and the direction orthogonal to both the X-axis direction and the Y-axis direction (i.e., the vertical direction) is defined as the Z-axis direction. In this embodiment, in FIG. 4, the depth direction is defined as the X-axis direction, the horizontal direction is defined as the Y-axis direction, and the vertical direction is defined as the Z-axis direction.

The double-sided arrows on the polarizing plates 36 and 56 indicate the directions of the absorption axes of these polarizing plates. The absorption axis of the polarizing plate 36 is parallel to the Y-axis direction, and the absorption axis of the polarizing plate 56 is parallel to the X-axis direction. The directions of the absorption axes of the polarizing plates 36 and 56 may be switched with each other. The alignment direction of the liquid crystal molecules LC is parallel to the Y-axis direction.

The liquid crystal device 1 according to this embodiment is characterized by the initial alignment state of the liquid crystal molecules LC. In FIG. 4, a direction inclined from a normal direction N to the substrate of the liquid crystal device 1 towards the Y-axis direction by an angle of $\theta_1$ is defined as a specific direction (priority viewing-angle direction) D in which an observer is supposed to be able to view a high-quality image. In this relationship, a pretilt angle $\theta_2$ is controlled such that the angle between the longitudinal direction of the liquid crystal molecules LC and an optical path, in the liquid crystal layer 20, of the light transmitted through the liquid crystal layer 20 in the priority viewing-angle direction D is large, i.e., near a right angle, in the initial alignment state of the liquid crystal molecules LC.

Although the longitudinal direction of the liquid crystal molecules LC may form a right angle with the priority viewing-angle direction D, it is more preferable that the longitudinal direction of the liquid crystal molecules LC form a right angle with the optical path, in the liquid crystal layer 20, of the light transmitted in the priority viewing-angle direction D. This is because the priority viewing-angle direction D and the optical path in the liquid crystal layer 20 are not the same since the light transmitted through the liquid crystal layer 20 in the priority viewing-angle direction D is refracted at the interface between the liquid crystal layer 20 and the surroundings.

Figure 5A:
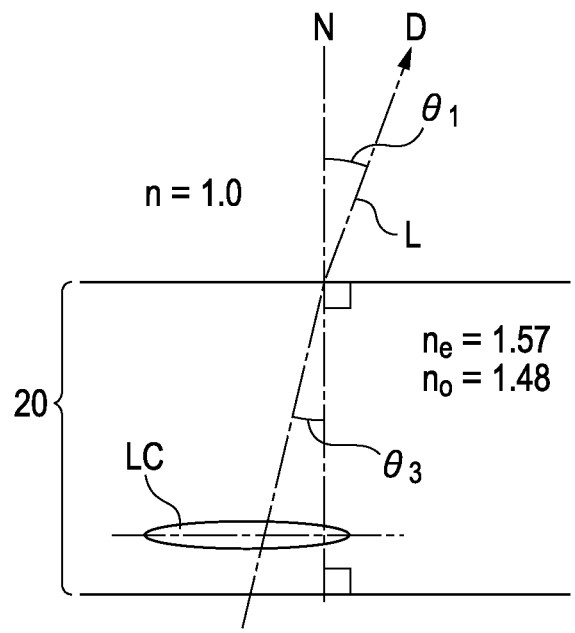
FIGS. 5A and 5B are schematic views showing operations of the liquid crystal devices according to a known structure and the first embodiment, respectively.
Figure 5B:
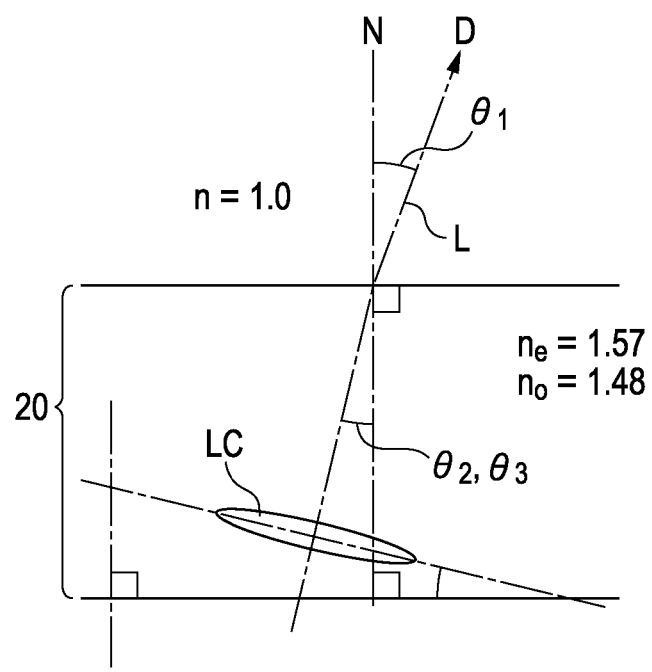

FIGS. 5A and 5B are schematic views showing the relationship between transmitted light L exiting the liquid crystal layer 20 in the priority viewing-angle direction D and the liquid crystal molecules LC. FIG. 5A shows an example of a known structure and FIG. 5B shows this embodiment. In FIGS. 5A and 5B, the liquid crystal molecules LC are illustrated as elliptical objects whose longitudinal direction is the longitudinal direction of the liquid crystal molecules LC. For explanation's sake, only the relationship between the liquid crystal layer 20 and the surroundings is shown.

As shown in FIG. 5A, the transmitted light L through the liquid crystal layer 20 having a known structure travels at an angle to the liquid crystal molecules LC in a homogeneous alignment. Therefore, a change in viewing angle varies the angle between the liquid crystal director and the polarization direction of the transmitted light L, and thus decreases the contrast.

On the other hand, in this embodiment, as shown in FIG. 5B, because the liquid crystal molecules LC are inclined at a pretilt angle of $\theta_2$, the optical path of the transmitted light L and the longitudinal direction of the liquid crystal molecules LC are orthogonal to each other. Therefore, a change in the viewing angle does not significantly change the angle between the liquid crystal director and the polarization direction of the transmitted light L traveling through the liquid crystal layer 20. Thus, it is possible to display a high-quality image without lowering the contrast.

The pretilt angle $\theta_2$ can be calculated using Snell's law with the inclination angle $\theta_1$ between the normal direction N and the priority viewing-angle direction D, and the refractive index, $n_e$, of the liquid crystal molecules LC for extraordinary light. Where the refractive index, n, of the surroundings (air) is 1.0, the refractive index, $n_o$, for ordinary light is 1.48, and the angle $\theta_1$ is 15 degrees, the incident angle, $\theta_3$, of the transmitted light L from the liquid crystal layer 20 is about 10 degrees because n×sin $\theta_1$=$n_o$×sin $\theta_3$ holds according to Snell's law. As shown in FIG. 5B, because the incident angle $\theta_3$ equals to the pretilt angle $\theta_2$, the pretilt angle $\theta_2$ is also about 10 degrees.

Figure 6:
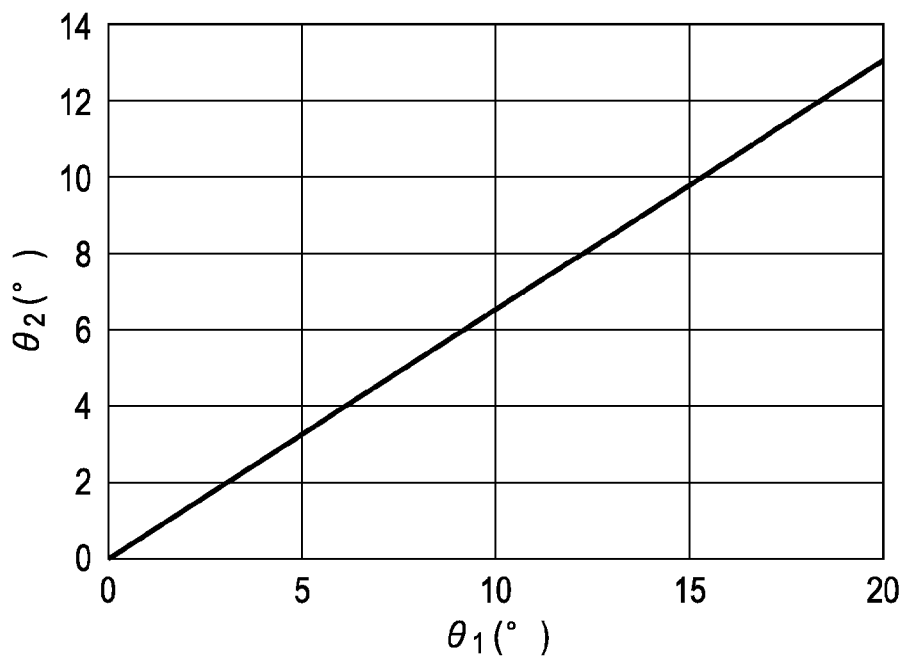
FIG. 6 is a graph showing a pretilt angle according to the first embodiment.

Similarly, using the aforementioned refractive index, n, of the surroundings and the refractive index, $n_o$, of the liquid crystal molecules LC for ordinary light, the relationship between the angle $\theta_1$ between the normal direction N and an arbitrary priority viewing-angle direction D and the pretilt angle $\theta_2$ may be given by the following expression (1). FIG. 6 is a graph showing the relationship between the angle $\theta_1$ and the pretilt angle $\theta_2$, expressed by using values of the above-mentioned refractive index, n, and the refractive index, $n_o$, for ordinary light.

$$\theta_2 = \sin^{-1}((n/n_o)\sin\theta_1) \qquad \text{Expression 1}$$

Figure 7:
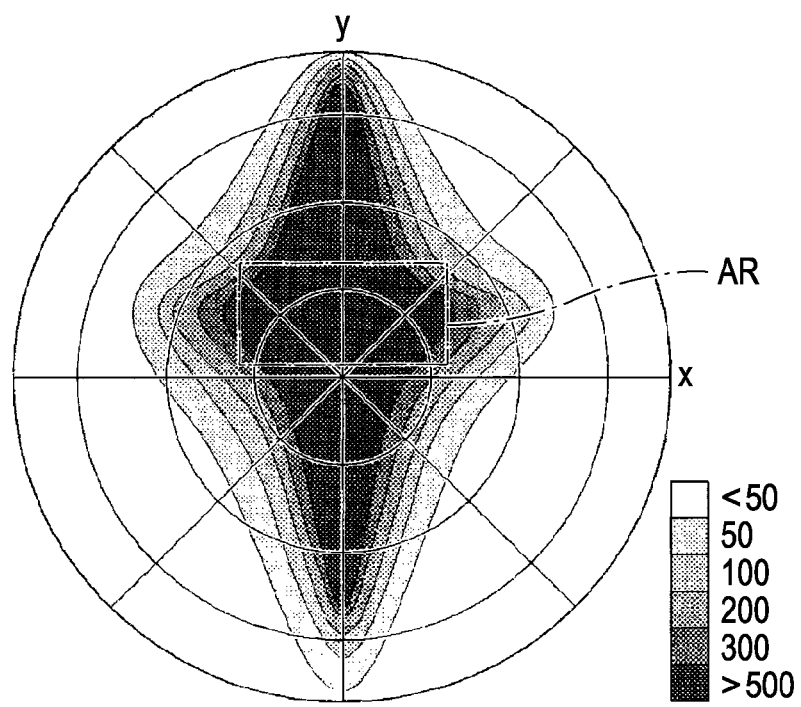
FIG. 7 is a contrast curve showing an effect of the liquid crystal device according to the first embodiment.

FIG. 7 is a contrast curve of the liquid crystal device 1 having the liquid crystal layer whose pretilt angle $\theta_2$ is controlled as described above. FIG. 7 corresponds to FIG. 19. When a direction inclined from the normal direction N to the device towards the Y-axis direction by about 15 degrees is defined as the priority viewing-angle direction D, an image is displayed using the light transmitted through an area AR. It is clear that the contrast at the corners of the area AR is improved compared to that shown in FIG. 19. By controlling the pretilt angle $\theta_2$ as described above, the liquid crystal device 1 can display a high-quality image having high contrast in the priority viewing-angle direction D.

In the liquid crystal device 1 having the above-described structure, the optical path in the priority viewing-angle direction D and the longitudinal direction of the liquid crystal molecules LC are orthogonal to each other. Thus, a change in viewing angle does not significantly change the angle between the liquid crystal director and the polarization direction of the transmitted light L traveling through the liquid crystal layer 20. Accordingly, the liquid crystal device 1 can display a high-quality image without lowering the contrast in the viewing-angle directions around the priority viewing-angle direction D.

Although the liquid crystal molecules LC have a positive anisotropy of dielectric constant in this embodiment, the liquid crystal molecules LC may have a negative anisotropy of dielectric constant. In such a case, the direction in which the strip-shaped electrodes 11b of the pixel electrodes 11 extend is rotated by 90 degrees in the horizontal direction so that the driving condition of the liquid crystal molecules LC is the same. Such a configuration enables design taking into consideration the restrictions on the layout of the components constituting the pixels and increases the design flexibility of liquid crystal devices. In addition, the strip-shaped electrodes 11 in FIG. 4 may be disposed parallel to the Y-axis direction or the X-axis direction, depending on the layout of the pixels. In such a case, the alignment direction of the liquid crystal molecules is rotated by 5 to 20 degrees from the Y-axis direction or the X-axis direction. However, even in such a case, the liquid crystal device 1 has the properties represented by the contrast curve rotated by 5 to 20 degrees from that shown in FIG. 7, in which the contrast in the area AR is improved compared to that shown in FIG. 19.

Although a light source of the transmitted light L is not mentioned in this embodiment, the light source of the transmitted light L may be disposed on the polarizing plate 36, on the side opposite the liquid crystal panel 10. In such a case, it is desirable that the direction in which the light source emits light be the maximum-intensity direction D of the light emitted from the liquid crystal panel 10. In this configuration, because the direction in which the light source emits light is a desired maximum-intensity direction D, the light can be efficiently emitted from the light source in the maximum-intensity direction D. Thus, the liquid crystal device 1 can display a high-quality image in a specific direction.

Second Embodiment

Figure 8:
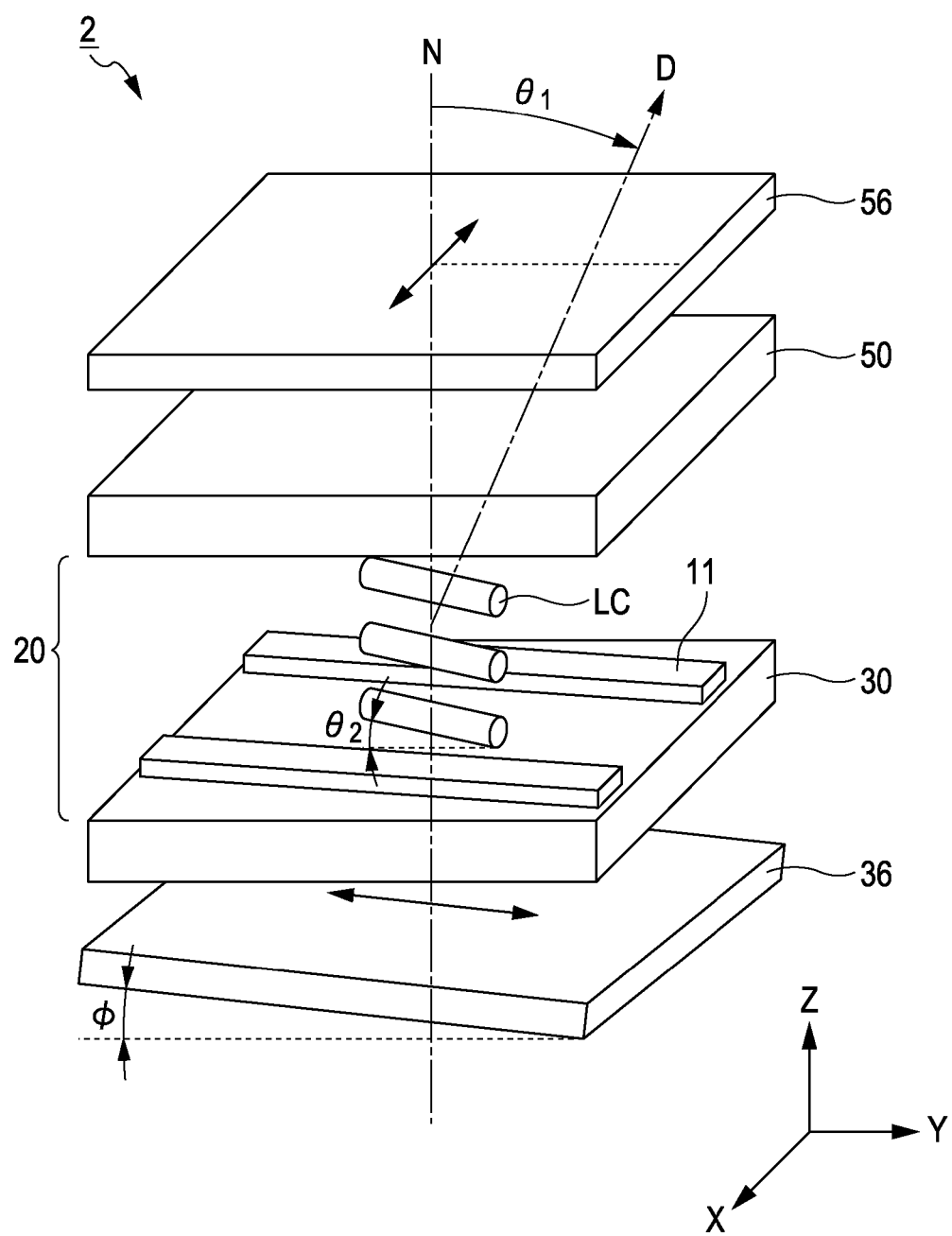
FIG. 8 is an exploded perspective view of a liquid crystal device according to a second embodiment of the invention.

FIG. 8 shows a liquid crystal device 2 according to a second embodiment of the invention. The liquid crystal device 2 according to this embodiment is similar to the liquid crystal device 1 according to the first embodiment but that the polarizing plate 36 disposed adjacent to the element substrate 30 is inclined at an angle of $\phi$. In addition, the directions of the absorption axes of the polarizing plates are defined. In the following description, like reference numerals denote like components of the first embodiment, and a detailed explanation thereof will not be given.

The polarizing plate 36 of the liquid crystal device 2, disposed adjacent to the element substrate 30, has the absorption axis aligned with the alignment direction of the liquid crystal molecules LC. The polarizing plate 36 is inclined towards the priority viewing-angle direction D at an inclination angle of $\phi$. In other words, the polarizing plate 36 is inclined at an inclination angle of $\phi$ such that the direction normal to the polarizing plate 36 is parallel to the priority viewing-angle direction D. It is preferable that the inclination angle $\phi$ be equal to the inclination angle, $\theta_1$, between the normal direction N to the substrate and the priority viewing-angle direction D.

Figure 9:
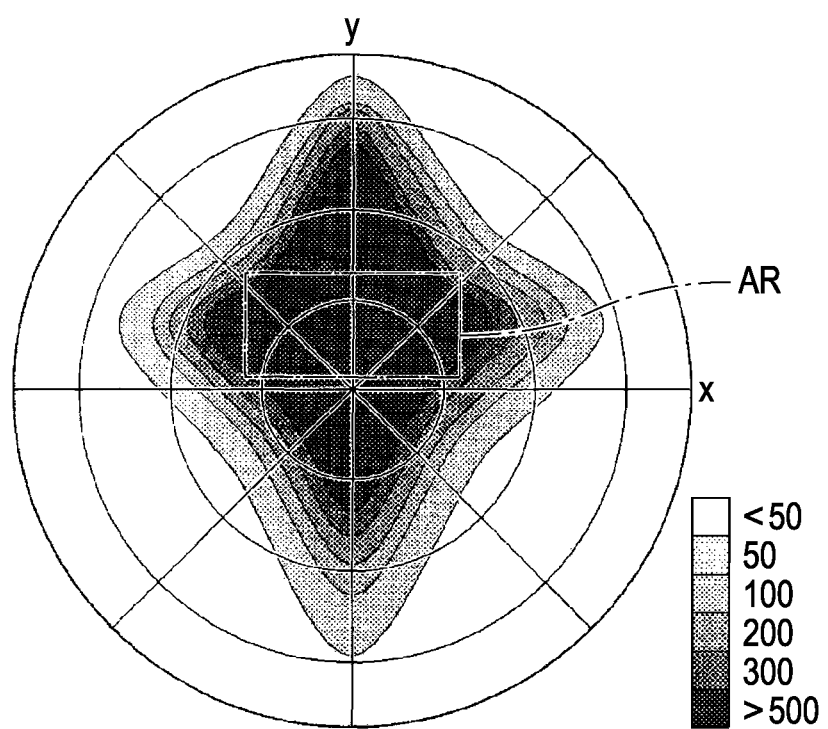
FIG. 9 is a contrast curve showing an effect of the liquid crystal device according to the second embodiment.

FIG. 9 is a contrast curve of the liquid crystal device 2, in which the polarizing plate 36 is inclined at an inclination angle of $\phi$ as described above. Similarly to FIG. 7 showing the first embodiment, FIG. 9 corresponds to FIG. 19. As shown in FIG. 9, the contrast at the corners of the area AR is much improved compared to that shown in FIG. 7.

In the liquid crystal device 2 having the above-described configuration, the combination of the inclined polarizing plate 36 and the polarizing plate 56 has the highest light-shielding performance in the viewing-angle directions around the priority viewing-angle direction D. Accordingly, the liquid crystal device 2 can display a high-quality image in the priority viewing-angle direction D.

The liquid crystal device 2 may further has a retardation film for compensating for a phase difference generated at the liquid crystal layer 20. In such a case, it is desirable that the retardation film be also inclined such that the direction normal to the retardation film and the direction of the optical path of the light L transmitted in the priority viewing-angle direction D are parallel to each other.

Figure 10:
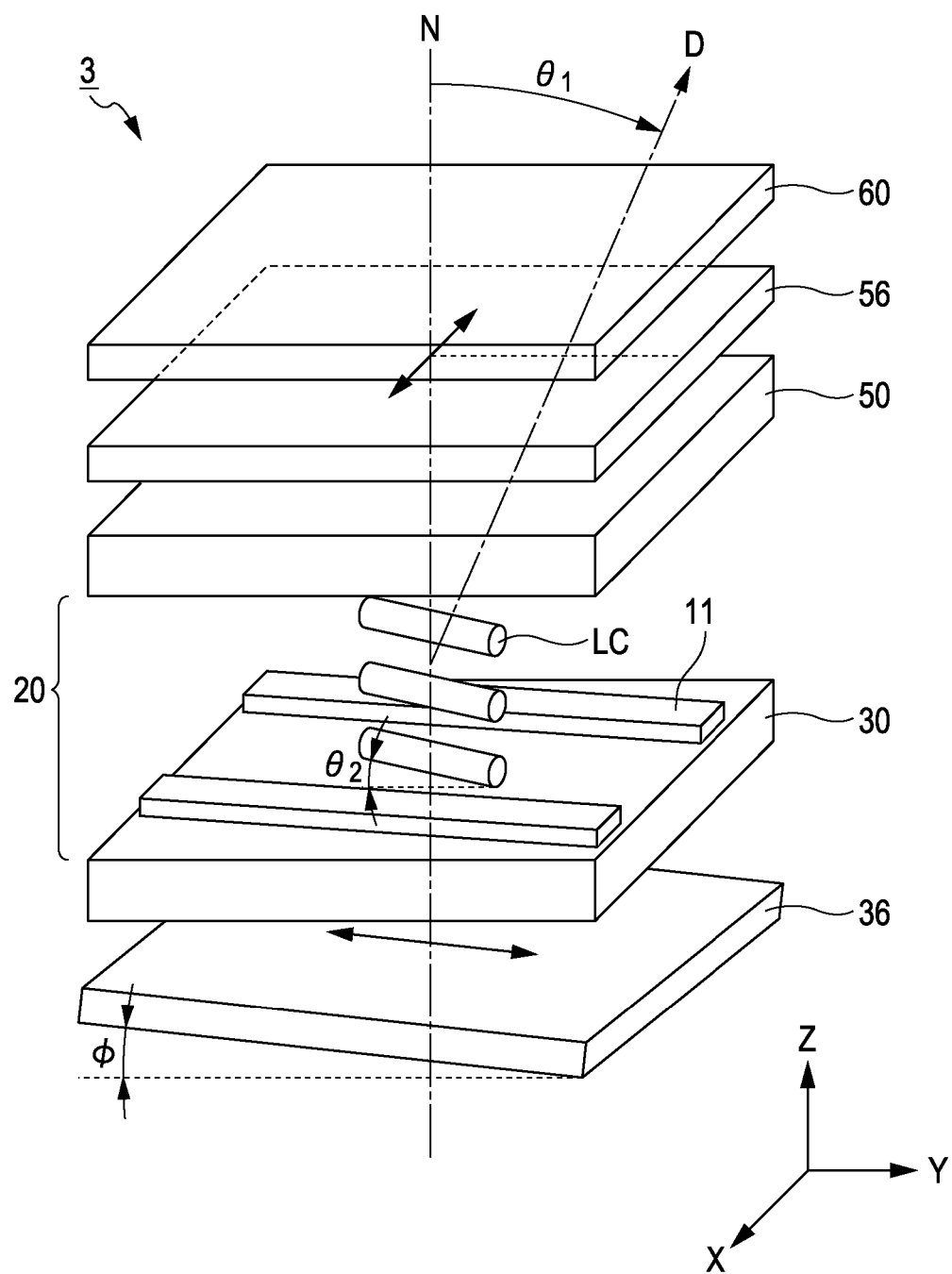
FIG. 10 is an exploded perspective view of a modification of the liquid crystal device according to the second embodiment.

Furthermore, as shown in a liquid crystal device 3 of FIG. 10, a retardation film 60 for shifting the phase of the light transmitted through the polarizing plate 56 by $\lambda/2$ may be disposed outside of the polarizing plate 56, depending on how the light transmitted through the device is used. For example, when an image is displayed using light reflected by a glass plate or the like, as in the above-mentioned HUD, s-light (or s-polarization), which is a polarization component horizontal to the incident surface, is more strongly reflected than p-light (or p-polarization), which is a polarization component perpendicular to the incident surface. Therefore, from the relationship between the polarization plane of the light transmitted through the liquid crystal device 2 and the reflection plane, it is preferable to convert the transmitted light into s-light by shifting the phase thereof using the retardation film.

Third Embodiment

Figure 11:
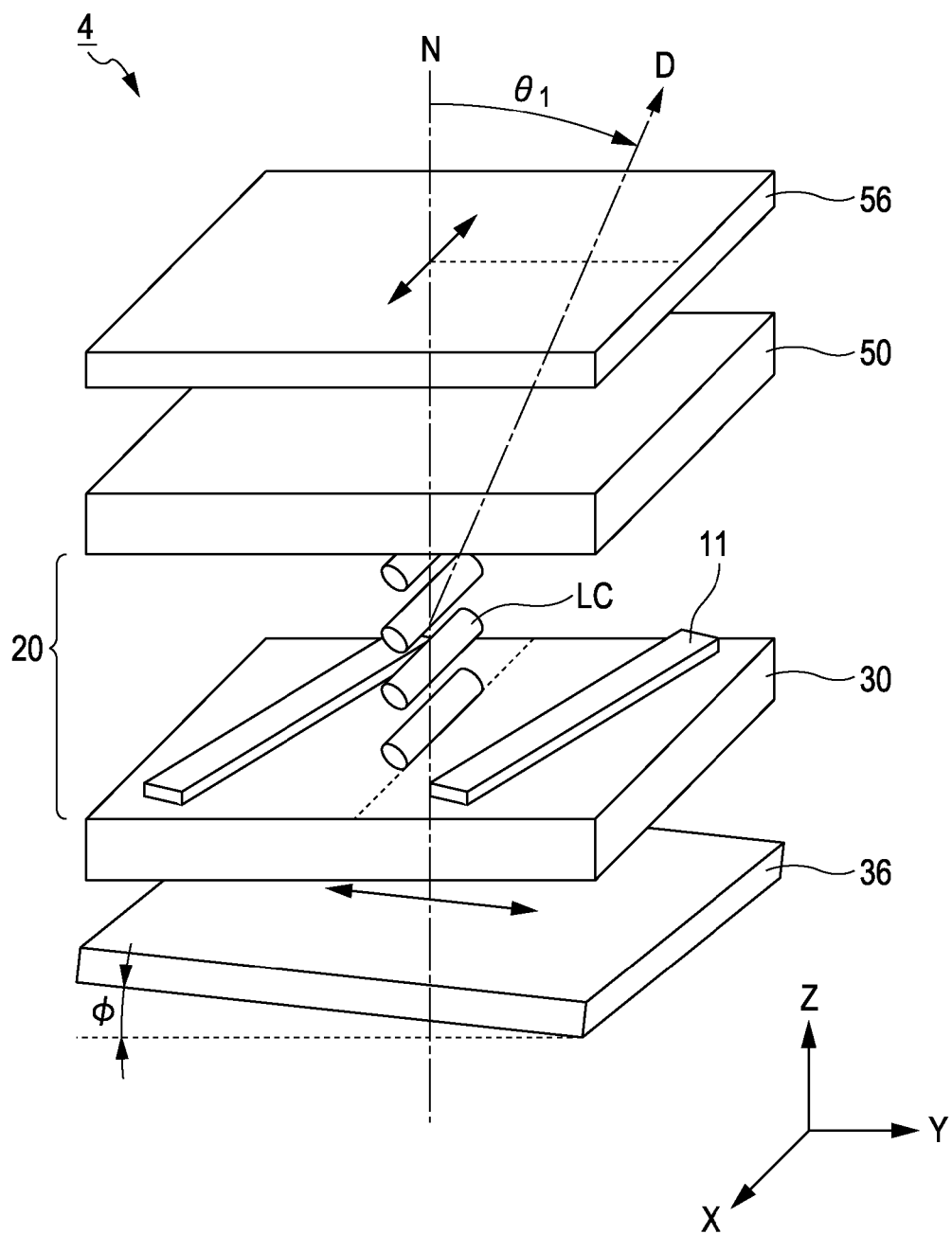
FIG. 11 is an exploded perspective view of a liquid crystal device according to a third embodiment of the invention.

FIG. 11 shows a liquid crystal device 4 according to a third embodiment of the invention. The liquid crystal device 4 according to this embodiment is similar to the liquid crystal device 2 according to the second embodiment but that the liquid crystal molecules LC are aligned in the X-axis direction. In this case, the liquid crystal molecules LC are aligned parallel to the element substrate 30 without a pretilt angle and the polarizing plate 36 is inclined at an angle of $\phi$. In this alignment state, the director direction of the liquid crystal molecules LC and the priority viewing-angle direction D are orthogonal to each other in the initial alignment state.

Figure 12:
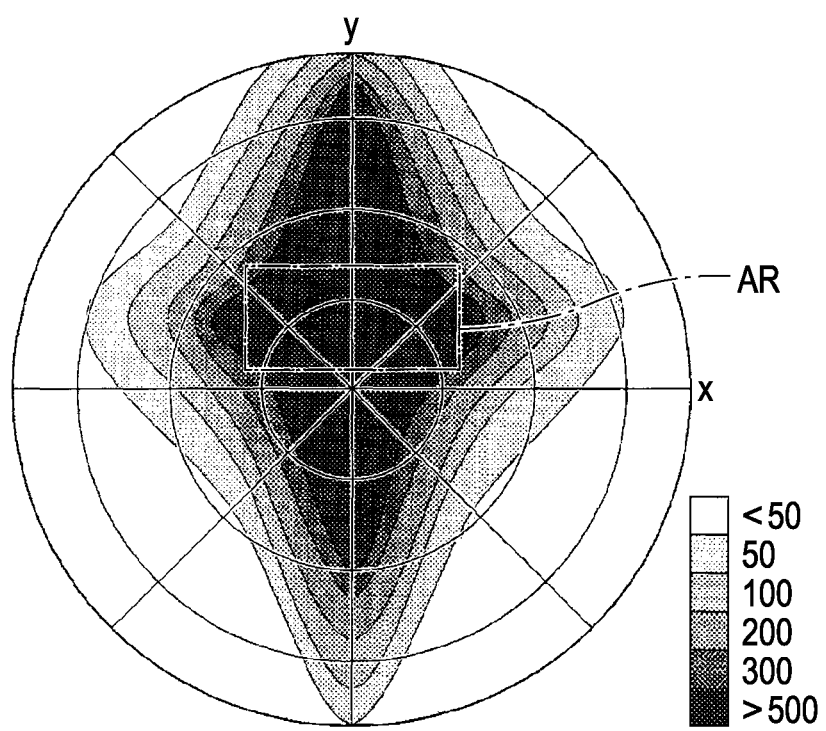
FIG. 12 is a contrast curve showing an effect of the liquid crystal device according to the third embodiment.
Figure 19:
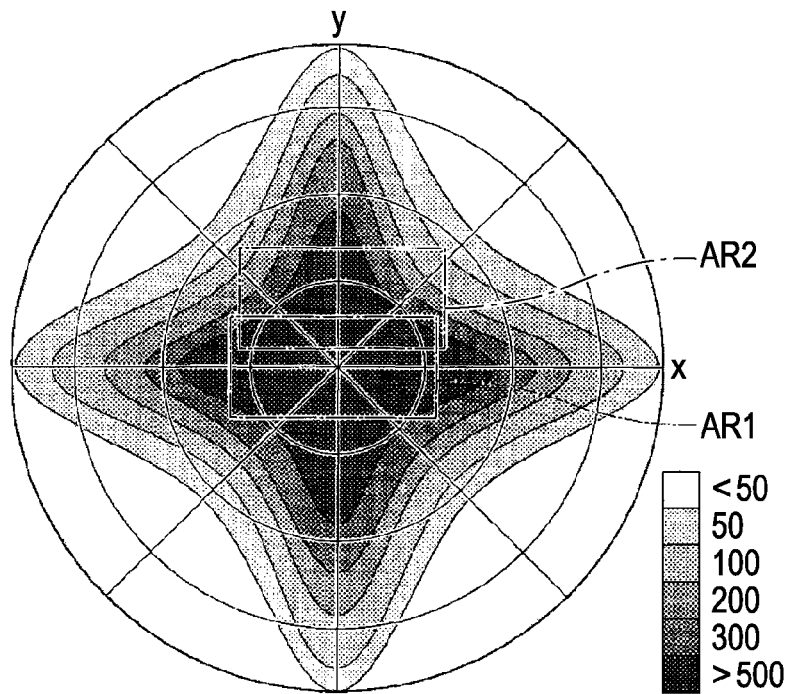
FIG. 19 is a contrast curve of a known liquid crystal device.
Figure 20:
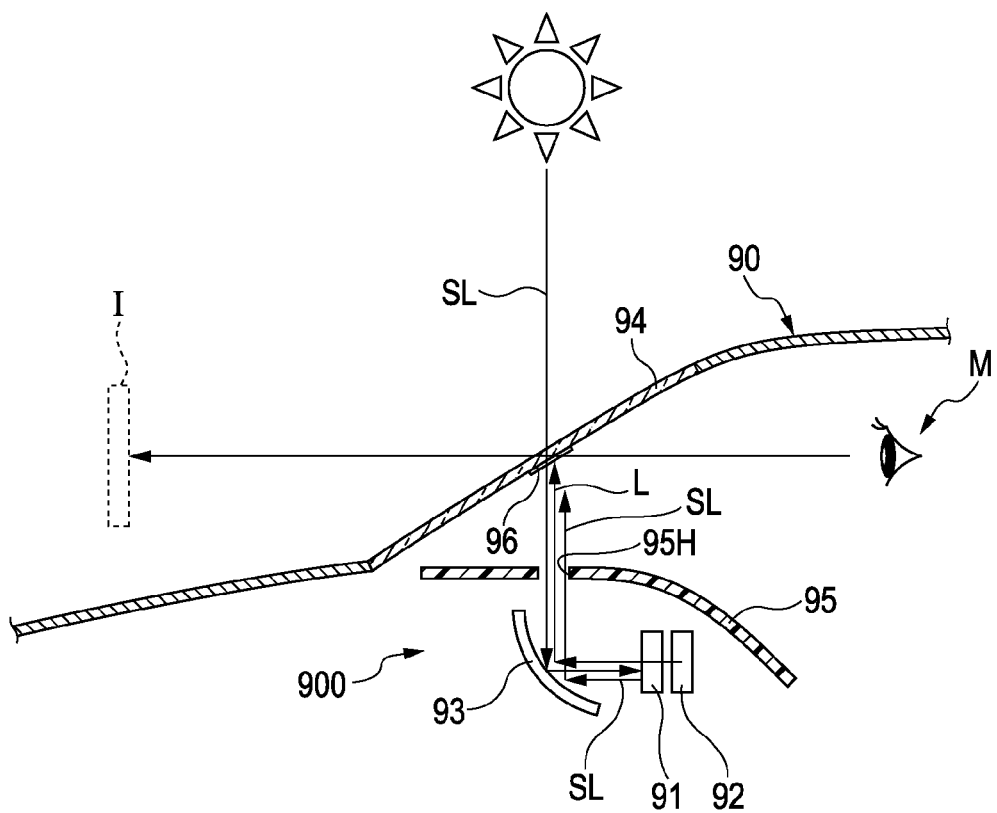
FIG. 20 is a schematic structural view of a known electronic device.

FIG. 12 is a contrast curve of the liquid crystal device 4, and corresponds to FIG. 19. As shown in FIG. 12, the contrast at the corners of the area AR used to display an image is improved compared to that shown in FIG. 19. Thus, the liquid crystal device 4 can display an improved image compared to a known liquid crystal device.

In the liquid crystal device 4 having the above-described structure, a change in viewing angle within the viewing-angle directions around the priority viewing-angle direction D does not significantly change the angle between the liquid crystal director and the polarization direction of the transmitted light L. Accordingly, the liquid crystal device 4 can display a high-quality image in a specific direction.

Fourth Embodiment

Figure 13:
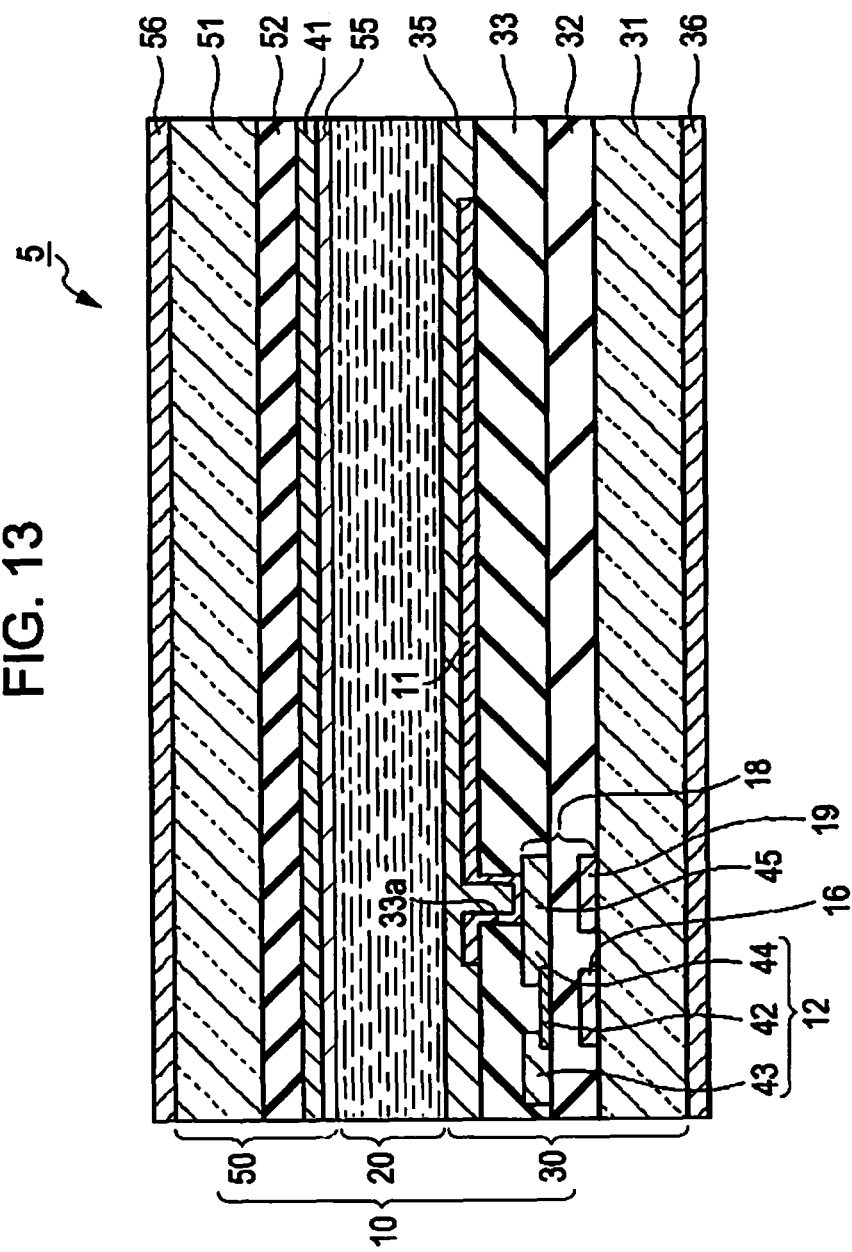
FIG. 13 is a partial sectional view of a liquid crystal device according to a fourth embodiment of the invention.
Figure 14:
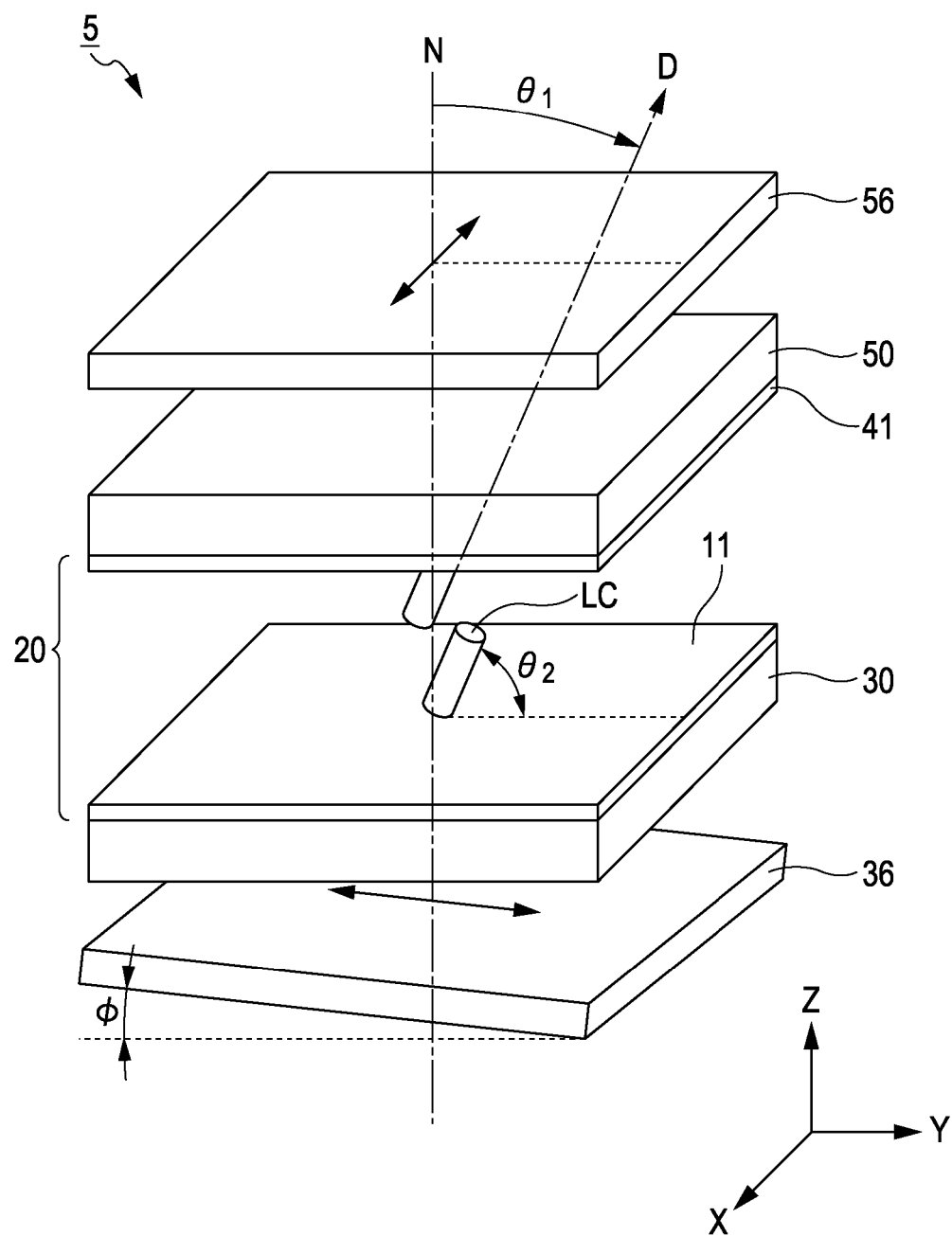
FIG. 14 is an exploded perspective view of the liquid crystal device according to fourth embodiment.

FIGS. 13 and 14 show a liquid crystal device 5 operating in a vertical alignment mode, according to a fourth embodiment of the invention. The liquid crystal device 5 according to this embodiment is different from the liquid crystal device operating in a lateral electric field mode. The liquid crystal molecules LC are aligned vertically to the element substrate 30 and the counter substrate 50 in the initial alignment state. First, a difference in structure between liquid crystal devices operating in a vertical alignment mode and a lateral electric field mode will be described with reference to FIG. 13, and then operation of the liquid crystal device 5 will be described with reference to FIG. 14.

As shown in FIG. 13, in the liquid crystal device 5, the pixel electrodes 11 are formed on the element substrate 30 side, and the common electrode 41 is formed on the counter substrate 50 side. The pixel electrodes 11 are provided with slits (not shown) so as to create an electric field in a direction different from the direction of a pretilt angle, described below, when a voltage is applied thereto, to lay the liquid crystal molecules LC in a direction different from the direction of the pretilt angle.

The pixel electrodes 11 are formed on the interlayer insulating film 33 such that they overlap the pixel display area, and the pixel electrodes 11 are covered with a vertical alignment film 35. On the other hand, the common electrode 41 is formed on the color filter 52 and is covered with a vertical alignment film 55. These vertical alignment films 35 and 55 serve to align the liquid crystal molecules LC in the liquid crystal layer 20 vertically with respect to the element substrate 30 and the counter substrate 50 when no voltage is applied, and may be composed of, for example, octadecyltrimethoxysilane (ODS) and formed by a known method.

The liquid crystal molecules LC in the liquid crystal layer 20 of the liquid crystal device 5, which operates in a vertical alignment mode, have a negative anisotropy of dielectric constant. Therefore, as shown in FIG. 14, in the liquid crystal device 5, a pretilt angle $\theta_2$ is controlled such that the director direction of the liquid crystal molecules LC and the optical path, in the liquid crystal layer 20, of the light transmitted through the liquid crystal layer 20 in the priority viewing-angle direction D are parallel to each other when no voltage is applied.

Figure 15:
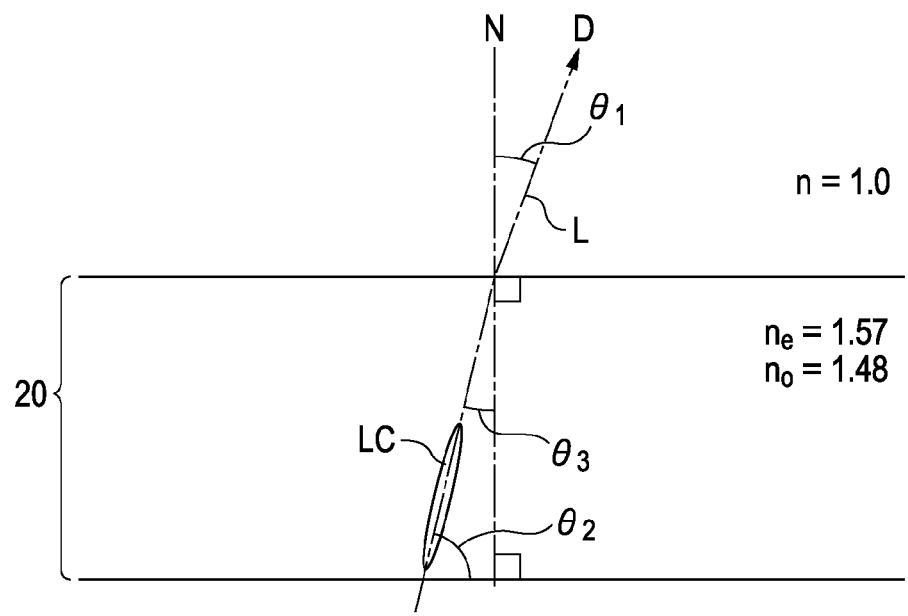
FIG. 15 is a schematic view showing an operation of the liquid crystal device according to fourth embodiment.

FIG. 15 shows the relationship between the transmitted light L emitted through the liquid crystal layer 20 of the liquid crystal device 5 in the priority viewing-angle direction D and the liquid crystal molecules LC. FIG. 15 corresponds to FIGS. 5A and 5B. As shown in FIG. 15, the pretilt angle $\theta_2$ can be calculated using Snell's law with the inclination angle $\theta_1$ between the normal direction N and the priority viewing-angle direction D, and the refractive index, $n_o$, of the liquid crystal molecules LC for ordinary light. Where the refractive index, n, of the surroundings (air) is 1.0, the refractive index, $n_o$, for ordinary light is 1.48, and the angle $\theta_1$ is 15 degrees, the incident angle, $\theta_3$, of the transmitted light L from the liquid crystal layer 20 is about 10 degrees because $n \times \sin \theta_1 = n_o \times \sin \theta_3$ holds according to Snell's law. As shown in FIG. 15, the pretilt angle $\theta_2$ can be calculated to be about 80 degrees from the incident angle $\theta_3$.

In the liquid crystal device 5 having the above-described structure, the transmitted light L through the liquid crystal layer 20 in the priority viewing-angle direction D propagates substantially parallel to the liquid crystal molecules LC. Therefore, the light L is less likely to be affected by the birefringence of the liquid crystal molecules LC even if the viewing angle is changed, and passes in an ideal phase. Accordingly, the light L transmitted in the viewing-angle directions around the priority viewing-angle direction D is less likely to cause contrast degradation due to the phase difference, whereby the liquid crystal device 5 can display a high-quality image.

Although the pixel electrodes 11 of the liquid crystal device 5 according to this embodiment have slits to apply an oblique electric field to drive the liquid crystal molecules LC, the pixel electrodes 11 may be formed without slits and lay the liquid crystal molecules LC in the pretilt direction.

Electronic Device

Figure 16:
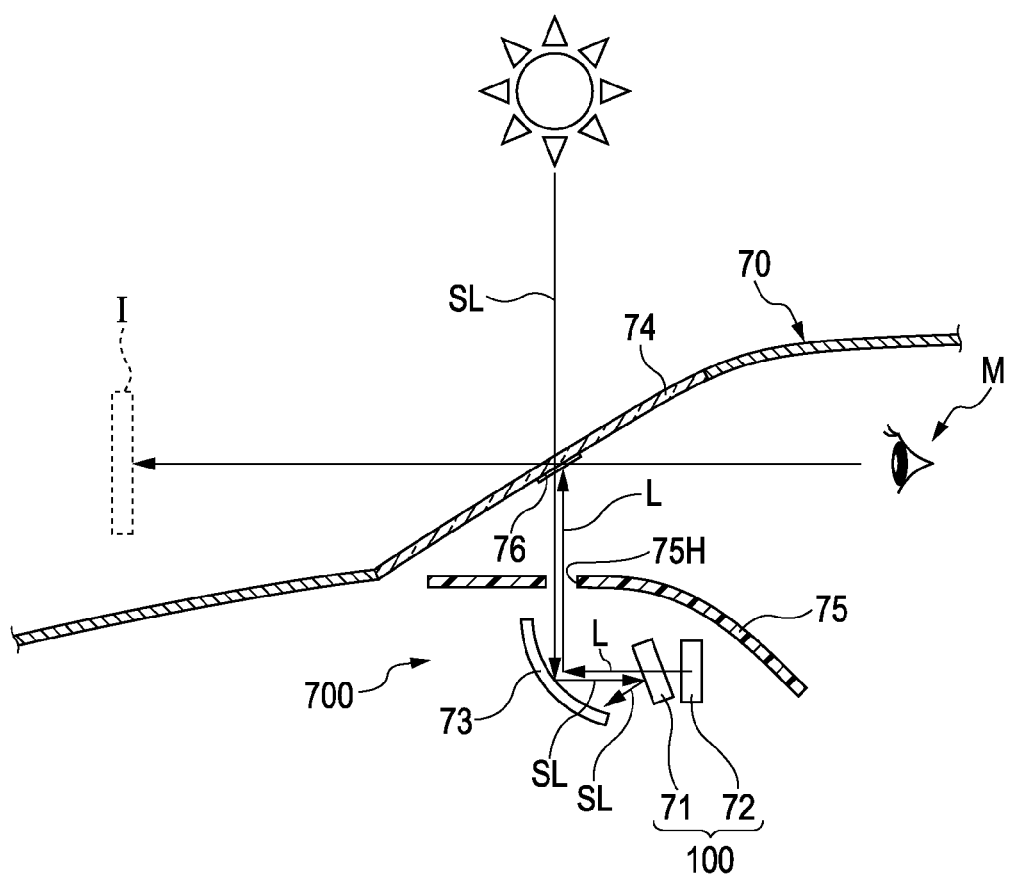
FIG. 16 is a schematic structural view of an electronic device of the invention.
Figure 17:
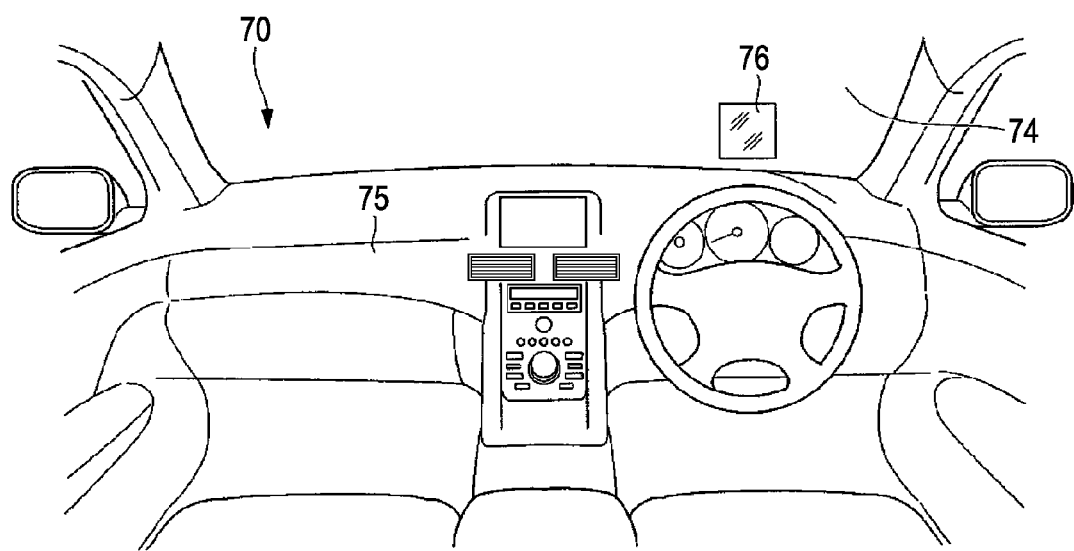
FIG. 17 is a schematic structural view of the electronic device of the invention.

FIG. 16 is a schematic structural view of a head-up display 700, which is an example of the electronic device having the liquid crystal device of the invention. FIG. 17 is a diagram showing an image displayed by the head-up display 700, seen from the driver's seat of a vehicle.

A vehicle 70 shown in FIG. 16 is a sedan passenger car. The head-up display 700 includes an electro-optic device 100 having a liquid crystal device 71 and a light source 72, a concave mirror (reflecting optical system) 73 that projects light L (image light) emitted from the electro-optic device 100 onto a front window 74, and a front window shield 76 that reflects the light projected onto the front window 74 towards the driver's seat.

The electro-optic device 100 is stored in a dashboard 75. The dashboard 75 has, below the front window 74, an opening 75H through which the light L passes. The light L reflected by the concave mirror 73 is projected onto the front window shield 76 through the opening 75H. The projected image, as a virtual image I, is viewed by an occupant M on the vehicle.

The front window shield 76 is made of, for example, a half-mirror film. Alternatively, a portion of light L may be reflected by treating the surface of the front window 74. As shown in FIG. 17, the front window shield 76 is situated in front of the driver's seat. The front window shield 76 displays information such as the speed, fuel level, and alert. The occupant M can see the information during driving by slightly shifting gaze.

The liquid crystal device 71 has the above-described structure of the invention. A direction inclined from a direction normal to the surface of the liquid crystal device 71 by a specific angle is defined as a priority viewing-angle direction. The liquid crystal device 71 is disposed obliquely, and the light L used to display an image passes in the priority viewing-angle direction. Therefore, in the head-up display 700, outside light SL incident on the surface of the liquid crystal device 71 can be reflected in a direction which the occupant M cannot see, and the occupant M can view a high-quality image displayed with the light transmitted in the priority viewing-angle direction.

Projector

Figure 18:
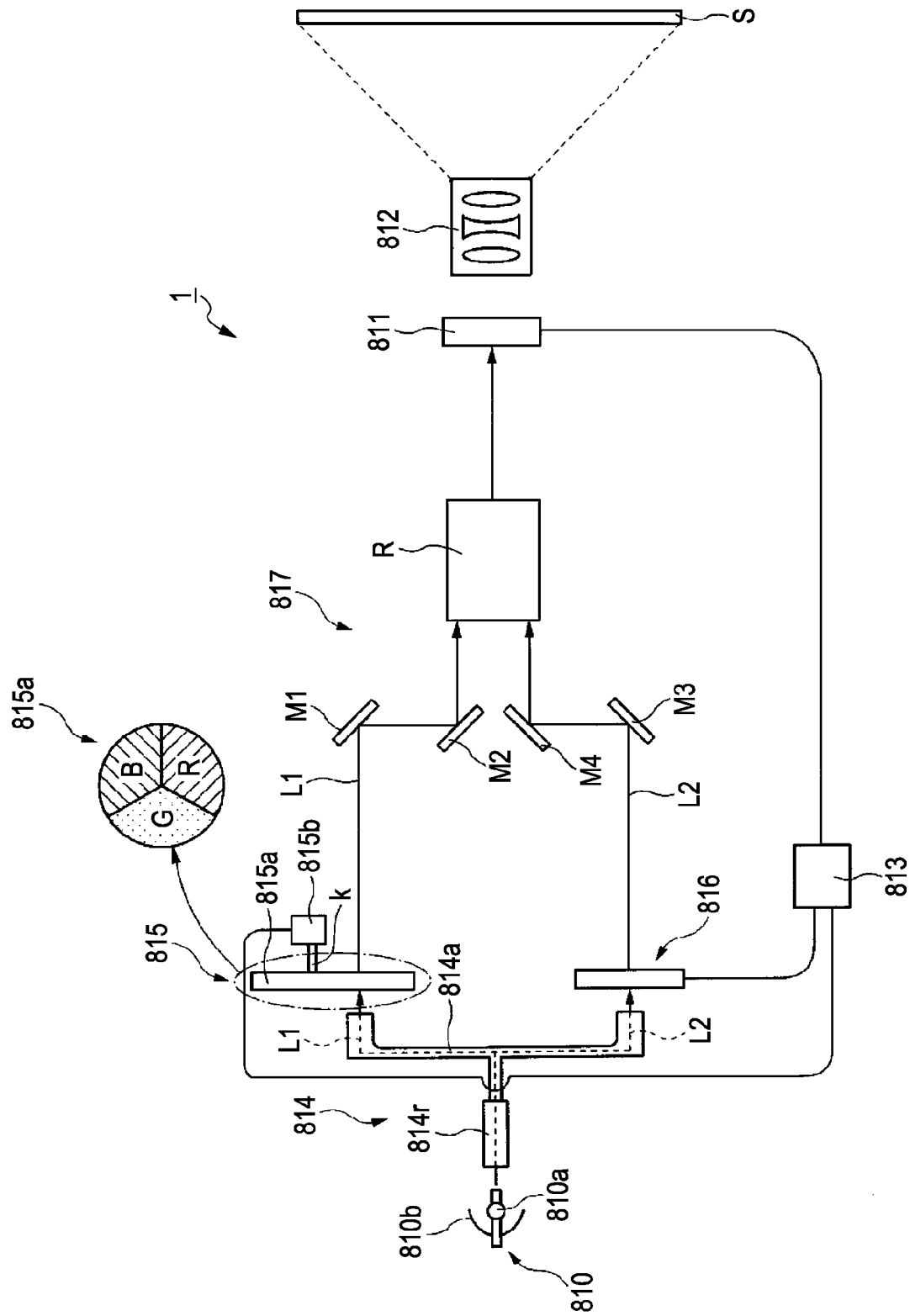
FIG. 18 is a schematic structural view of a projector of the invention.

FIG. 18 is a schematic structural view of a projector having a liquid crystal device of the invention. A projector 800 includes, as shown in FIG. 18, a light source 810, a liquid crystal device 811 that modulates light from the light source 810 time-sequentially to generate optical images of R, G, and B, and a projector lens 812 that projects a magnified optical image generated by the liquid crystal device 811 onto a screen S. The projector 800 further includes an information separation unit 813 that separates image information for forming an image to be displayed on the screen S into color information and brightness information, which enables the projector 800 to control the light from the light source 810 on the basis of the color information and the brightness information.

The projector 800 includes a light-separating unit 814 that separates the light from the light source 810, a color time division unit 815 for generating predetermined color light on the basis of the color information, a brightness-modulated light generating unit 816 for generating brightness-modulated light on the basis of the brightness information, and a combining unit 817 that combines the light transmitted through the color time division unit 815 and the light transmitted through the brightness-modulated light generating unit 816.

The light source 810 includes a high-pressure mercury vapor lamp 810a that emits light and a reflector 810b that reflects the light emitted from the high-pressure mercury vapor lamp 810a. The high-pressure mercury vapor lamp 810a emits white light.

The liquid crystal device 811 has the above-described structure of the invention, and the oblique direction corresponding to the projection angle at which the projector 800 projects an image onto the screen S at a short distance is aligned with the priority viewing-angle direction of the liquid crystal device 811. Thus, the projector 800 can project a high-contrast, high-quality image onto the screen S at a short distance.

Although the preferable embodiments of the invention have been described with reference to the attached drawings, the invention is of course not limited to such embodiments. The shape and combination of the components disclosed in the above-described embodiments are by way of example only and may be modified in various ways within the scope of the invention in response to design requirements.

The entire disclosure of Japanese Patent Application No. 2008-051699, filed Mar. 3, 2008 is expressly incorporated by reference herein.

What is claimed is:

1. A liquid crystal device, comprising:
a light source;
a liquid crystal panel configured to operate in a vertical alignment mode and including a pair of substrates and a liquid crystal layer sandwiched between the pair of substrates, the liquid crystal layer containing liquid crystal molecules having a negative anisotropy of dielectric constant; and
polarizing plates disposed on opposite sides of the liquid crystal panel,
wherein one of the polarizing plates is disposed between the light source and the liquid crystal panel,
wherein the liquid crystal molecules are inclined at a pretilt angle and aligned in a predetermined direction in planes of the pair of substrates,
wherein the liquid crystal panel is configured to transmit light emitted by the light source and entering through said one of the polarizing plates toward the other of the polarizing plates,
wherein the liquid crystal panel is configured to have a maximum transmission for the light in a maximum intensity direction different from a direction normal to the planes of the pair of substrates,
wherein the light source is configured to generate the light in the maximum intensity direction,
wherein an azimuth of the maximum intensity direction projected onto the planes of the pair of substrates is substantially parallel to the predetermined direction, and
wherein the maximum intensity direction is inclined from the direction normal to the pair of substrates toward a direction in which the maximum intensity direction and a longitudinal direction of the liquid crystal molecules inclined at the pretilt angle are progressively closer to being parallel to each other.

2. The liquid crystal device according to claim 1,
wherein an absorption axis direction of one of the polarizing plates is substantially parallel to the predetermined direction, and
wherein the polarizing plate with the absorption axis direction substantially parallel to the predetermined direction is inclined from the pair of substrates of the liquid crystal panel toward a direction in which a direction normal to the polarizing plate and the maximum intensity direction are parallel to each other.

3. The liquid crystal device according to claim 1, further comprising a viewing-angle compensation retardation film,
wherein the retardation film is inclined from the pair of substrates of the liquid crystal panel toward a direction in which a direction normal to the retardation film and the maximum intensity direction are parallel to each other.

4. An electronic device comprising the liquid crystal device according to claim 1,
wherein the liquid crystal device is configured to display an image in a direction in which the light transmitted through the liquid crystal device has the maximum intensity.

5. A projector comprising the liquid crystal device according to claim 1,
wherein the liquid crystal device is configured to project an image in a direction in which the light emitted from the liquid crystal device has the maximum intensity.

6. A liquid crystal device, comprising:
a light source;
a liquid crystal panel including a pair of substrates and a liquid crystal layer sandwiched between the pair of substrates, the liquid crystal layer containing liquid crystal molecules; and
polarizing plates disposed on opposite sides of the liquid crystal panel,
wherein one of the polarizing plates is disposed between the light source and the liquid crystal panel,
wherein the liquid crystal molecules are aligned in a predetermined direction in planes of the substrates,
wherein the liquid crystal panel is configured to transmit light emitted by the light source and entering through said one of the polarizing plates to the other one of the polarizing plates,
wherein the liquid crystal panel is configured to have a maximum transmission for the light in a maximum transmission direction different from a direction normal to the planes of the substrates,
wherein the light source is configured to generate the light in the maximum transmission direction,
wherein an absorption axis direction of one of the polarizing plates is substantially perpendicular to the predetermined direction, and
wherein the polarizing plate with the absorption axis direction substantially perpendicular to the predetermined direction is inclined from the planes of the substrates of the liquid crystal panel toward the predetermined direction in which a direction normal to the polarizing plate and the maximum transmission direction are progressively closer to being parallel to each other.

* * * * *